United States Patent [19]

Okada et al.

[11] Patent Number: 4,723,635
[45] Date of Patent: Feb. 9, 1988

[54] DISK BRAKE HAVING A METAL BACKING PLATE WITH EXTRA LONG ARCUATE EXTENSIONS AT EACH END

[75] Inventors: Mitsuo Okada, Chiba; Hideaki Tanaka; Satoshi Hayashi, both of Saitama, all of Japan

[73] Assignee: Akebono Brake Industry Co., Ltd., Tokyo, Japan

[21] Appl. No.: 928,683

[22] Filed: Nov. 7, 1986

Related U.S. Application Data

[63] Continuation of Ser. No. 755,738, Jul. 17, 1985, abandoned.

[30] Foreign Application Priority Data

Jul. 19, 1984 [JP]   Japan ..................... 59-108249[U]

[51] Int. Cl.⁴ ..................... F16D 65/00; F16D 65/02
[52] U.S. Cl. ..................... 188/73.1; 188/73.39; 188/250 B
[58] Field of Search ............. 188/73.1, 73.2, 250 B, 188/250 G, 250 E, 250 R, 73.39, 73.43–73.45, 73.32–73.34, 206 R, 206 A, 73.31; 192/107 A

[56]   References Cited

U.S. PATENT DOCUMENTS

| | | | |
|---|---|---|---|
| 3,310,135 | 3/1967 | Wells | 188/73.39 X |
| 3,349,871 | 10/1967 | Walther et al. | 188/250 B X |
| 3,502,183 | 3/1970 | Hahm | 188/250 B |
| 3,972,393 | 8/1976 | Courbat et al. | 188/73.1 X |
| 4,106,595 | 8/1978 | Kimura et al. | 188/73.45 |
| 4,220,223 | 9/1980 | Rinker et al. | 188/250 B X |
| 4,225,017 | 9/1980 | Opden Camp | 188/73.39 X |
| 4,321,984 | 3/1982 | Burgdorf et al. | 188/73.39 |
| 4,335,806 | 6/1982 | Lupertz | 188/73.39 X |
| 4,465,163 | 8/1984 | Matsumoto | 188/73.39 |
| 4,537,290 | 8/1985 | Evans | 188/250 B X |
| 4,548,300 | 10/1985 | Sheill et al. | 188/250 B X |
| 4,560,038 | 12/1985 | Gerard et al. | 188/73.1 X |

FOREIGN PATENT DOCUMENTS 2163500   2/1986   United Kingdom .......... 188/250 B

Primary Examiner—Douglas C. Butler
Attorney, Agent, or Firm—Cushman, Darby & Cushman

[57]   ABSTRACT

A disk brake arrangement for a motor vehicle includes a metal backing plate shaped so as to have at each end thereof, a recessed portion. The support, rigidly attached to the motor vehicle, includes peripheral wall portions shaped to fit within a corresponding receased portion of the pad assembly. The cooperation of these portions prevents a rotation of the pad assembly during braking.

2 Claims, 7 Drawing Figures

DISK BRAKE HAVING A METAL BACKING PLATE WITH EXTRA LONG ARCUATE EXTENSIONS AT EACH END

This is a continuation of application Ser. No. 755,738, filed July 17, 1985, now abandoned.

BACKGROUND OF THE INVENTION

1. Field of the Invention

The present invention relates generally to the structure of disk brake arrangements for motor vehicles. More particularly, the present invention relates to disk brake arrangements intended for large cars, buses or trucks.

2. Brief Description of the Prior Art

Brake arrangements of the disk-type have become popular. They are used not only for small automobiles, but also for larger cars, buses and large trucks, or the like. FIGS. 3-5 (PRIOR ART) show a conventional disk brake mounted on a large vehicle. The disk brake is arranged such that an annular fitting portion 2 of a support 1 is fitted and fixed to a knuckle 3 of the vehicle by bolts (not shown) screwed into thread holes 4. A caliper 6 is attached to support 1 with its opposite ends loosely respectively engaged with a pair of pins 5 transversely provided at upper portions of support 1 such that the caliper is slidable inward/outward. As used herein, "inward" is the direction toward the center of the vehicle to which the disk brake is attached (rightward in FIG. 4) and "outward" is the direction toward the outer end portion of the car (leftward in FIG. 4). Pads 10 are located at the opposite sides of a disk rotor 9 connected with a hub 7 of a wheel by bolts 8 secured in the hub 7. These pads 10 are sandwiched between a piston 11 mounted within caliper 6 and a caliper pawl formed at one end portion of the caliper 6 so that linings 13 attached to metal backing plates 12 of respective pads 10 are adapted to be pressed against the disk rotor 9 by piston 11 urged by oil pressure. In this case, in order to support the dead weight of pads 10, to bear the braking torque acting on the pads 10 due to the friction between the side surfaces of the disk rotor 9 and linings 13 in the braking operation, and to guide the inward/outward movement of the pads 10, guide grooves 15 are respectively formed in protrusions 14 projected from a peripheral wall 20 of the support 1. Protrusions 16 of respective metal backing plates 12 are engaged with the guide grooves 15 to thereby support the pads 10 on the support 1 and to cause the support 1 to bear the torque.

The thus arranged conventional disk brake is attached onto a car through the following steps:

(1) Support 1, caliper 6, pads 10, and disk rotor 9 are assembled with one another before the support is fixed to the car body;

(2) This assembly is attached to knuckle 3 at fitting portion 2 of the support 1. The disk rotor 9 is positioned such that it is still movable vertically and horizontally while surrounding a knuckle spindle;

(3) Next, hub 7 is pushed into the center portion of the disk rotor 9 and coupled with the knuckle 3 while making the bolt holes of the disk rotor 9 coincide with the respective bolts 8 planted secured in the hub 7; and (4) Then, the disk rotor 9 is fixed to hub 7 by screwing nuts onto the respective bolts 8, thereby completing the attachment of the disk brake.

Work of this kind, especially on a large car, is extremely difficult because it is required to perform centering of the bolt holes of the disk rotor 9 with respect to the bolts and to screw the nuts onto the bolts 8 in a narrow space while manually handling a hub 7 as well as a brake which are large in size and heavy in weight.

If protrusions 14 of the support 1 could be omitted, the work could be easily performed in such a manner that disk rotor 9 would be incorporated into the brake at the same time as the hub 7 would be inserted into the knuckle 3, under the condition that in a wider space the disk rotor 9 had been attached in advance to the hub 7 by the bolts 8, and assembled support 1 and caliper 6 had been attached to the knuckle 3 at the fitting portion 2 of the support 1 with the knuckle 6 held set up by making the caliper 6 swing about one of the pins 5 with the other pin 5 removed. If the projecting portion were omitted, however, it would be impossible to provide guide groove 15 for bearing the outer pad 12 so that it would be impossible to support the outer pad 12 as well as the torque in the braking operation under such a condition.

In order to solve such a problem, there was proposed a disk brake having a structure such as disclosed in U.S. Pat. No. 4,106,595. Such structure is shown in FIGS. 6 and 7 (PRIOR ART). The disk brake comprises a caliper 6 slidably mounted on a support 1a fixed on a car body at the inside of a disk rotor 9 rotating together with a wheel so that the wheel is braked through the disk rotor 9 by urging a pair of pads 10 located in opposition to inner and outer side surfaces of the disk rotor 9 respectively by caliper 6 to contact with the disk rotor 9. A pair of peripheral walls 20 extended from the inside to the outside of the disk rotor 9 are separated from each other with a distance in the rotational direction of the disk rotor 9 and are formed at the peripheral edge portion of a support 1a at positions coming off from the disk rotor 9. At outer end portions of the respective peripheral walls 20, protrusions bent toward the center side in the disk rotor 9 are eliminated. The outer end portions are shaped such that the disk rotor 9 can be axially inserted from the outside. Straight-cut surfaces 17 are formed in the opposite end portions of metal backing plates 12b of pads 10a located outside the disk rotor 9 and a pair of bearing surfaces 19 opposed to each other are formed at portions of the peripheral walls 20 of support 1a located outside the disk rotor 9 such that the straight-cut surfaces 17 are adapted to slidably abut on the bearing surfaces 19.

A pair of pawls 18 extending in the opposite direction to each other are respectively formed on the opposite end portions of the metal backing plate 12a and engaged with pins 5 for guiding the movement of caliper 6. Protrusions 16 are respectively formed at the opposite end portions of the inner pad 10 and are respectively slidably engaged with guide grooves 15, respectively formed in opposition to each other in the inside portions of peripheral walls 20 of the support 1a, whereby caliper 6 is adapted to be rotated about one of the pair of pins 5 with the other pin 5 removed to thereby remove/attach the pair of pads 10.

The thus arranged disk brake is mounted onto a car through the following steps:

(1) An assembly of the caliper 6 and the support 1a connected with each other by the pins 5 is fitted onto knuckle 3 at fitting portion 2;

(2) One of the pins 5 is taken off and caliper 6 is swung about the other remaining pin 5, with inner pad 10 engaged with the opposite side guide grooves 15 at its respective protrusions 16 and with outer pad 10a taken off;

(3) Hub 7 with the disk rotor 9, attached thereto through bolts 8 in advance, is fitted onto the knuckle 3 through a bearing (the work to attach the rotor 9 to the hub 7 being easy because it can be performed in a wide space). Differing from the prior art arrangements shown in FIGS. 3–5 (PRIOR ART), support 1a has no protrusions 14 and the caliper 6 is raised up, and therefore it is possible to insert the disk rotor 9 into the support 1a with no hindrance and it is easy to attach the hub 7 onto the knuckle 3 with ease.

(4) Then, outer pad 10a having been taken off is inserted between the peripheral walls 20 of the support 1a at the outside of the disk rotor 9, one of the pawls 18 at the upper end surface of the pad 10a is engaged with the remaining pin 5, the caliper 6 is put back to grasp the pads 10 and 10a located at the opposite end portions of the disk rotor 9, the pin 5 taken out before is inserted into the support 1a, the caliper 6, and the other pawl 18 of the metal backing plate of the outer pad 10a, thus completing assembling of the disk brake.

The disk brake is mounted onto the vehicle in such a manner as described above to remarkably facilitate the brake mounting work, so that it becomes unnecessary to perform such difficult work in the prior art in that the hub 7 was coupled with the knuckle 3 through centering between the bolts 8 of the hub 7 and the respective bolt holes of the disk rotor 9 while supporting by hand the heavy disk rotor 9 and then the nuts were screwed onto the bolts 8 in a narrow space.

Next, when a worn-out old pad is replaced by a new pad 10, one pin 5 (the right pin, for example, in FIG. 6 (PRIOR ART)) is taken off and the caliper 6 is rotated about the other pin 5 counterclockwise in FIG. 6 (PRIOR ART). Thus, the interior equipment portions of pistons 11 which have been in opposition to the metal backing plate of the inner pad 10 are detached upward, so that the inner pad 10 can be taken off by moving it upward in FIG. 7 (PRIOR ART) along the guide groove 15. If the right end portion of the outer pad 10a is pulled down a little in FIG. 7 (PRIOR ART) to thereby release the engagement between the straight-cut surface 17 of the right end portion and the bearing surface 19 of the peripheral wall 20 of the support 1a, and then the pad 10a is displaced to the right in the same drawing with its slightly inclined attitude, the left pawl 18 of the pad 10a is released from the pin 5 to thereby permit the pad 10a to be taken off. On the other hand, the work for attaching new pads 10 and 10a is performed in the reverse order of the above-mentioned steps.

Thus, the working efficiency can be extremely improved because the pad replacing work can be easily performed by taking off only one pin 5 and requires no attaching/detaching operation for a heavy caliper.

Even though the arrangement shown in FIGS. 6–7 (PRIOR ART) is easily mounted and can have pads 10 replaced easily, there is an operational problem.

When the vehicle is braked, the lining 13 of the pad 10 does not linearly slide-contact with the side surface of the rotor 9, but arcuately slidably contacts with the latter in accordance with the rotation of the rotor 9 rotating with the wheel. Therefore, when rotor 9 rotates, for example, counterclockwise in FIG. 6 (PRIOR ART), a force for making the pad 10 rotate in the direction of an arrow as in FIG. 6 (PRIOR ART) is applied to the pad 10. If such a force for making the pad 10 rotate acts in a braking operation, the abutting force between the edge of the metal backing plate 12a of the pad 10 and the bearing surface 19 of the support 1a becomes uneven so that the edge of the metal backing plate 12a or the bearing surface 19 of the support 1a wears out partially. That is, an abutting pressure at a portion X near the outer periphery at an anchor side (left in FIG. 6) of the metal backing plate 12 becomes especially strong, and the wearing out at the portion X proceeds so as to generate a loose state between the metal backing plate 12a of the pad 10 and the support 1a.

SUMMARY OF THE INVENTION

An object of the present invention is to provide a disk brake in which partiality in abutting pressure between the supporting surface of the support and the edge of the metal backing plate of the pad is eliminated while maintaining such the advantage in the prior art that the brake mounting work on a car as well as the pad replacing work can be easily performed.

The heart of the invention lies in the shape of the metal backing plate 12b of the pad assembly (including a brake pad 10 and a metal backing plate 12b) and the shape of support 1a. Support 1a is formed with peripheral wall portions 20 that fit into recessed portions 23 of the pad assembly. The cooperation of these parts prevent a rotation of the pad assembly when braking force is applied, while permitting easy installation of the pad assembly.

BRIEF DESCRIPTION OF THE DRAWINGS

Throughout the drawings, like reference numerals denote like or corresponding parts.

DETAILED DESCRIPTION OF THE PREFERRED EMBODIMENT

Figure 1:
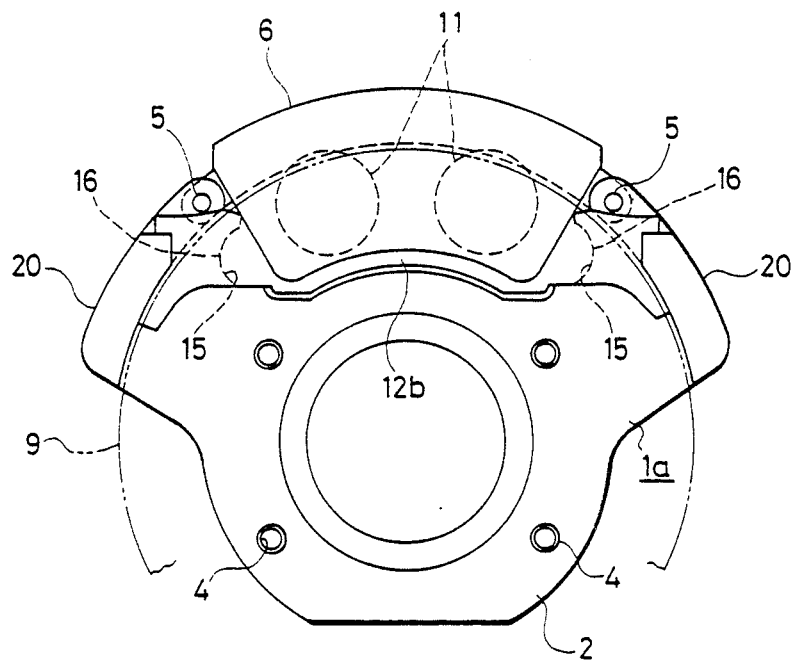
FIG. 1 is a front view of a disk brake arrangement according to the present invention.
Figure 2:
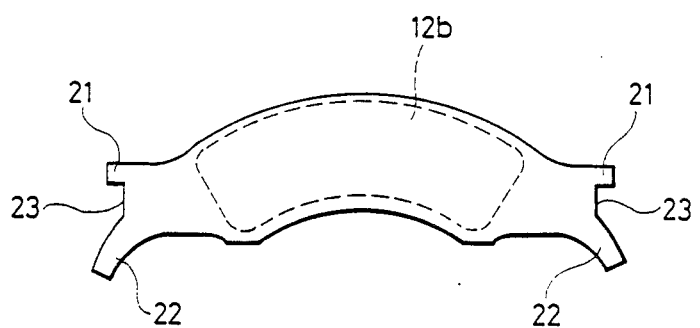
FIG. 2 is a front view of a pad incorporated into the disk brake arrangement of the present invention.

Referring now to FIGS. 1 and 2, there is shown the disk brake arrangement according to the present invention, and a pad incorporated therein, respectively.

Opposite end portions of the metal backing plate 12b of the pad located outside the disk rotor are not shaped in the form of straight-cut surfaces. Rather, they are shaped such that tines projecting outward with a recess therebetween are formed at each of the opposite end portions of the metal backing plate 12b. The tines are fitted with the respective one of the edge portions facing each other of the peripheral walls 20 of the support 1a, so that the pad can be prevented from rotating by the engagement between the edges of the support 1a and the tines of the opposite end portions of the metal backing plate 12b even if a force for rotating the pad is applied thereon.

Metal backing plate 12b of the pad to be attached to the disk brake of the present invention is shaped in the form shown in FIG. 1. Protrusions 21 are respectively formed at the opposite ends of the metal backing plate 12b of the pad at portions near to the outer periphery of the pad and arcuate extensions 22 circumferentially extending farther in length than the protrusions 21 along the outer periphery of the disk rotor are respectively formed at the same opposite ends of the metal backing plate 12b at portions near to the inner periphery of the pad, with recesses 23 each formed between the lower edge of the protrusion 21 and the upper edge of the extension 22. As shown in FIG. 1, the shape of each of the recesses 23 complementarily agree with each of the opposite edge portions of peripheral walls 20 formed at the support 1a along the outer periphery of the disk rotor. Therefore, the respective recesses 23 at opposite end portions of metal backing plate 12b are closely fitted onto the edge portions of the peripheral walls 20. In this state, even if a force for making the metal backing plate 12b rotate is applied thereto, due to the friction between the disk rotor and the lining during the braking operation, the applied force is borne because the protrusions 21 and the extensions 22 abut onto the peripheral walls 20, respectively, so that the force in the rotating direction and the braking torque are compounded to prevent a partial pressure from acting on the abutting surface between the metal backing plate 12b and peripheral walls 20 of the support 1a.

Figure 3:
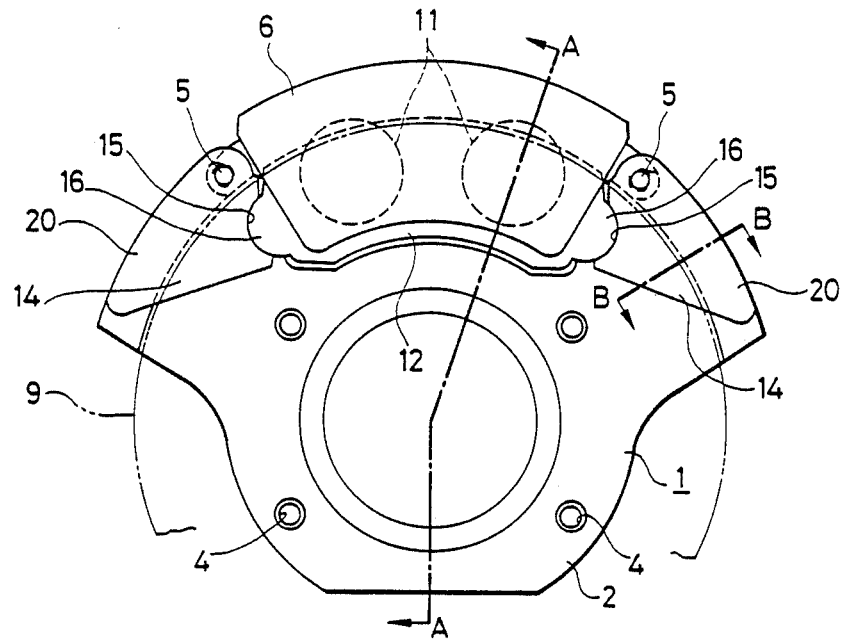
FIG. 3 (PRIOR ART) is a front view of a conventional disk brake.
Figure 4:
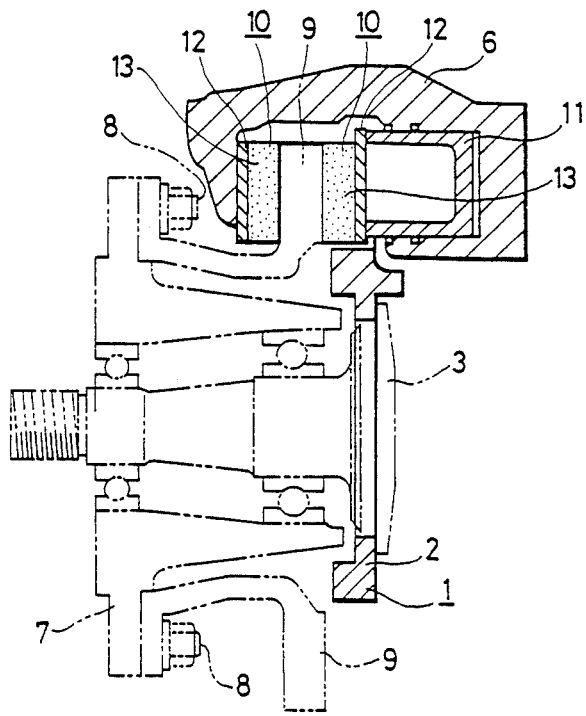
FIG. 4 (PRIOR ART) is a cross-section taken along line A—A of FIG. 3 (PRIOR ART)
Figure 5:
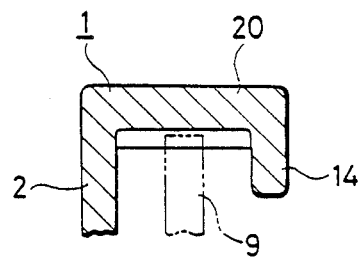
FIG. 5 (PRIOR ART) is a cross-section taken along line B—B of FIG. 3 (PRIOR ART)

Similarly to the conventional disk brake, support 1a formed with the peripheral walls 20 at its outer edge portions for supporting the metal backing plate 12b of the pad at the edge portions thereof has an attaching portion, such as annular fitting portion 2 shown in FIGS. 3–5 (PRIOR ART), so that caliper 6 having pistons 11 incorporated therein is slightly slidably mounted on a pair of the right and left pins. The peripheral or circumferential walls 20 each have an arcuate inner surface and a top surface, as is clearly illustrated in FIG. 1. Since the metal backing plate 12b of the pad can be completely prevented from coming off because the respective edges of the recesses 23 at the opposite end portions of the metal backing plate 12b and the respective edges of the peripheral walls 20 are fitted with each other, no pawls 18, such as the one shown in FIG. 6 (PRIOR ART), for engaging with the pins 5 are provided at the outer peripheral edge of the metal backing plate 12b. Protrusions 16 are respectively formed at the opposite end portions of the inner pad 10 so as to be slidably engaged with the pair of guide grooves 15 formed opposite to each other at the inside portion of the support 1a.

Figure 6:
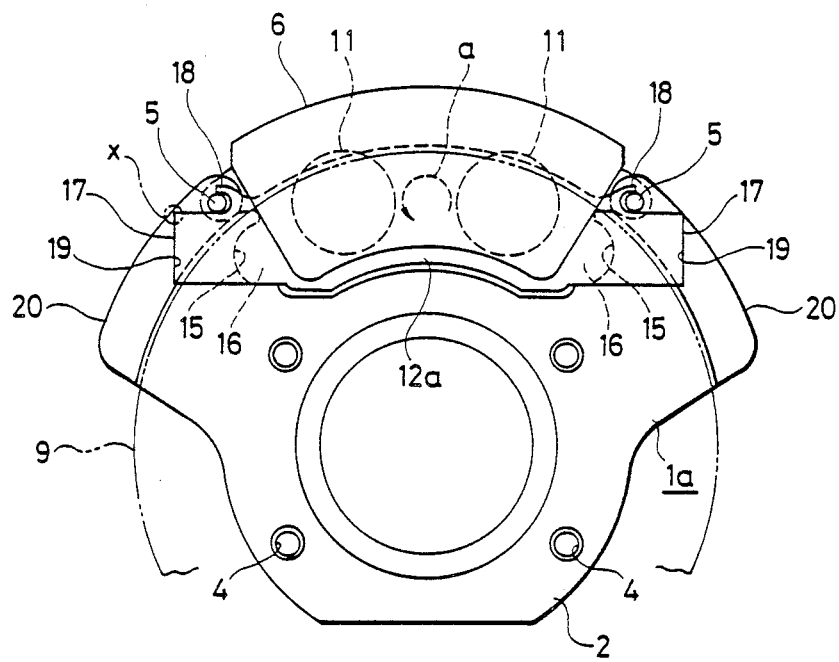
FIG. 6 (PRIOR ART) is a front view of a known disk brake arrangement.
Figure 7:
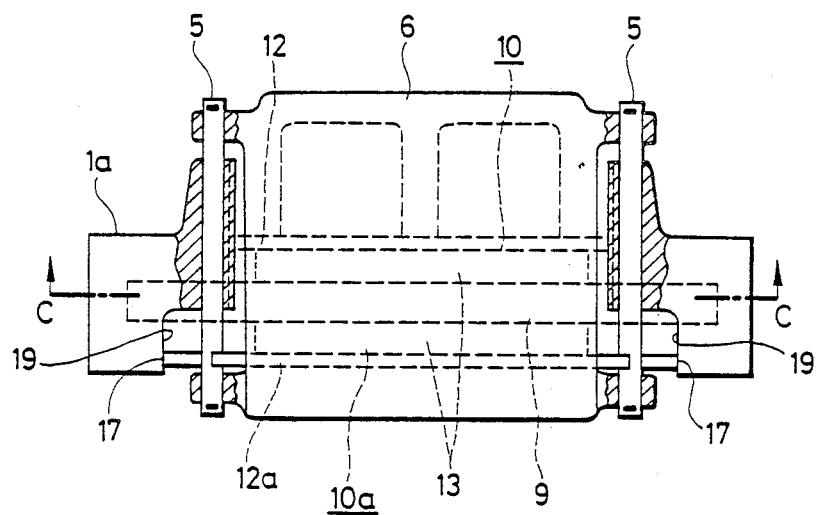
FIG. 7 (PRIOR ART) is a plan view of the disk brake arrangement shown in FIG. 6 (PRIOR ART).

In the thus arranged disk brake according to the present invention, the function in the braking operation, the work for mounting the disk brake onto the car body, as well as the work for replacing the pad are the same as the disk brake of the prior art as shown in FIGS. 6–7 (PRIOR ART).

Being arranged in such a manner as described above, the disk brake according to the present invention is advantageous in that inclination in abutting pressure between the support and the metal backing plate of the pads in the braking operation is eliminated to thereby prevent partial abrasion of the respective abutting surfaces of the metal backing plates and the support to provide superior durability, while maintaining the advantages in the prior art disk brake in which the work to incorporate the disk brake into a car body as well as the work to replace the pads can be easily performed.

While the invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

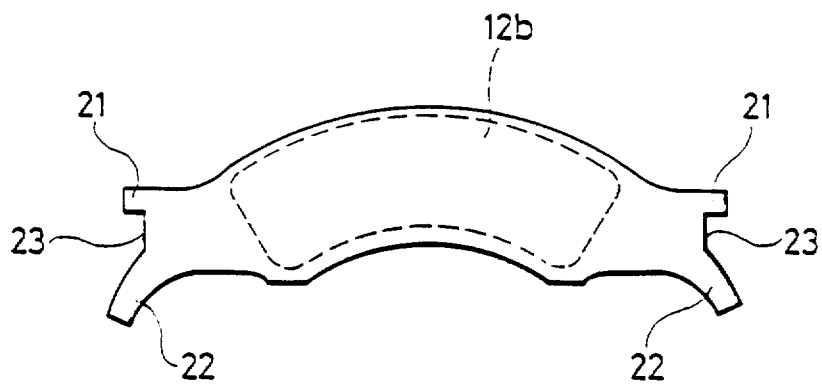

We claim:

1. A disk brake for a wheel of a vehicle comprising: rotor disk means for rotating with the wheel;
a support fixed to the vehicle, said support having a pair of projecting circumferential walls extending from opposite sides thereof, each of said walls having a circular inner surface and a top surface, said circular inner surface being concentric with the outer surface of said rotor disk;
an inside backing plate positioned on an inner side of said rotor disk means;
an outside backing plate positioned on an outer side of said rotor disk means, said outside backing plate having a pair of recesses defined on opposite sides thereof by a pair of upper protrusions and a pair of downwardly extending lower arcuate extensions; said recesses in said backing plate mating with said circumferential walls so as to secure said outside backing plate to said support, said lower arcuate extensions of the outer backing plate engaging said arcuate inner surfaces of said walls and said protrusions engaging said top surfaces of said walls; and
a caliper means, movably secured on said support, for moving said inside and outside backing plates towards said rotor disk means.

2. The disk brake according to claim 1, wherein said caliper means is secured to the support by pins.

* * * * *

UNITED STATES PATENT AND TRADEMARK OFFICE
CERTIFICATE OF CORRECTION

PATENT NO. : 4,723,635

DATED : February 9, 1988

INVENTOR(S) : Mitsuo Okada, et al

It is certified that error appears in the above-identified patent and that said Letters Patent is hereby corrected as shown below:

The title page should be deleted to appear as per attached title page.

Signed and Sealed this

Twenty-second Day of November, 1988

Attest:

DONALD J. QUIGG

*Attesting Officer*     *Commissioner of Patents and Trademarks*

United States Patent [19]

Okada et al.

[11] Patent Number: 4,723,635
[45] Date of Patent: Feb. 9, 1988

[54] DISK BRAKE HAVING A METAL BACKING PLATE WITH EXTRA LONG ARCUATE EXTENSIONS AT EACH END

[75] Inventors: Mitsuo Okada, Chiba; Hideaki Tanaka; Satoshi Hayashi, both of Saitama, all of Japan

[73] Assignee: Akebono Brake Industry Co., Ltd., Tokyo, Japan

[21] Appl. No.: 928,683

[22] Filed: Nov. 7, 1986

Related U.S. Application Data

[63] Continuation of Ser. No. 755,738, Jul. 17, 1985, abandoned.

[30] Foreign Application Priority Data

Jul. 19, 1984 [JP] Japan .................... 59-108249[U]

[51] Int. Cl.⁴ .................... F16D 65/00; F16D 65/02
[52] U.S. Cl. .................... 188/73.1; 188/73.39; 188/250 B
[58] Field of Search ............... 188/73.1, 73.2, 250 B, 188/250 G, 250 E, 250 R, 73.39, 73.43–73.45, 73.32–73.34, 206 R, 206 A, 73.31; 192/107 A

[56] References Cited

U.S. PATENT DOCUMENTS

| 3,310,135 | 3/1967 | Weils | 188/73.39 X |
| 3,349,871 | 10/1967 | Walther et al. | 188/250 B X |
| 3,502,183 | 3/1970 | Hahm | 188/250 B |
| 3,972,393 | 8/1976 | Courbat et al. | 188/73.1 X |
| 4,106,595 | 8/1978 | Kimura et al. | 188/73.45 |
| 4,220,223 | 9/1980 | Rinker et al. | 188/250 B X |
| 4,225,017 | 9/1980 | Opden Camp | 188/73.39 X |
| 4,321,984 | 3/1982 | Burgdorf et al. | 188/73.39 |
| 4,335,806 | 6/1982 | Lupertz | 188/73.39 X |
| 4,465,163 | 8/1984 | Matsumoto | 188/73.39 |
| 4,537,290 | 8/1985 | Evans | 188/250 B X |
| 4,548,300 | 10/1985 | Sheil et al. | 188/250 B X |
| 4,560,038 | 12/1985 | Gerard et al. | 188/73.1 X |

FOREIGN PATENT DOCUMENTS 2163500 2/1986 United Kingdom ......... 188/250 B

Primary Examiner—Douglas C. Butler
Attorney, Agent, or Firm—Cushman, Darby & Cushman

[57] ABSTRACT

A disk brake arrangement for a motor vehicle includes a metal backing plate shaped so as to have at each end thereof, a recessed portion. The support, rigidly attached to the motor vehicle, includes peripheral wall portions shaped to fit within a corresponding recessed portion of the pad assembly. The cooperation of these portions prevents a rotation of the pad assembly during braking.

2 Claims, 7 Drawing Figures